No. 703,796. Patented July 1, 1902.
G. LAKHOVSKY.
BOLT RETAINER.
(Application filed July 24, 1901.)
(No Model.)
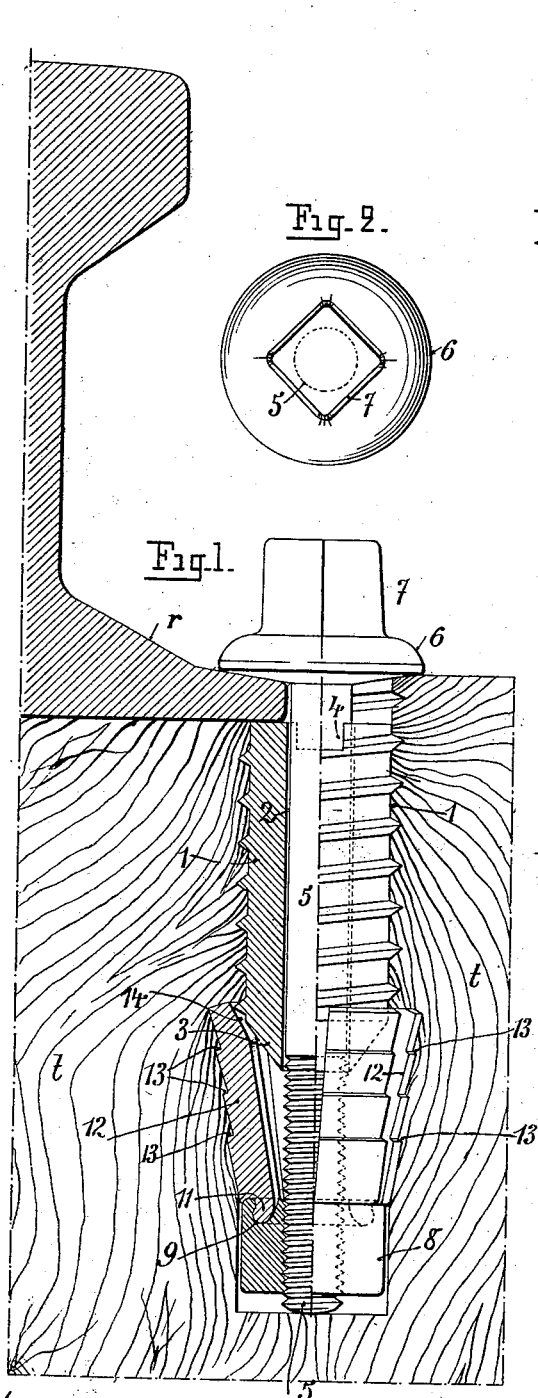
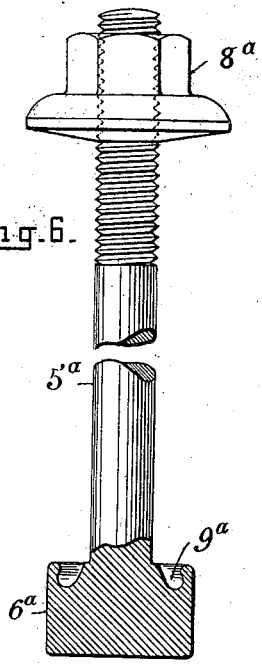
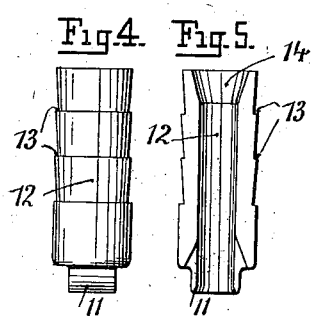
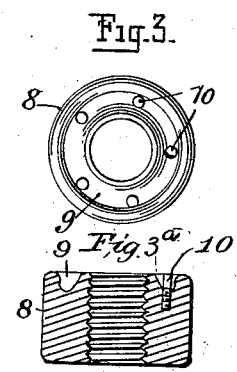
Witnesses:
Inventor
Georges Lakhovsky

UNITED STATES PATENT OFFICE.

GEORGES LAKHOVSKY, OF PARIS, FRANCE.

BOLT-RETAINER.

SPECIFICATION forming part of Letters Patent No. 703,796, dated July 1, 1902.

Application filed July 24, 1901. Serial No. 69,615. (No model.)

*To all whom it may concern:*

Be it known that I, GEORGES LAKHOVSKY, a subject of the Emperor of Russia, residing at 272 Boulevard St. Germain, Paris, France, have invented certain new and useful Improvements in Bolt-Retainers, of which the following is a specification.

This invention relates to retaining devices for screws or bolts, and particularly to such when employed for securing railway-rails to cross-ties or stringers of wood.

In the accompanying drawings, which illustrate the invention, Figure 1 is a sectional view showing the device set in a railway-tie, the fastener being shown one half in axial section and the other half in elevation. Fig. 2 is a plan or end view of the device. Fig. 3 is a plan view of the nut detached. Fig. 3ª is a section of the nut, showing one of the studs set therein. Figs. 4 and 5 are respectively an exterior and and an interior elevation of one of the segments of the expansible portion of the retainer. Fig. 6 illustrates a slightly-modified construction.

In Fig. 1, $r$ designates the foot-flange of a railway-rail, and $t$ a tie of wood on which the rail rests and to which it is secured. In a hole of the proper diameter bored in the wood is set the securing device, which will now be described. This device comprises as its members a screw-threaded cylinder or tubular part 1, having an axial cylindrical bore 2. At one end this cylinder is coned, as seen at 3, and at the other end it has a nick or cross-groove 4 to receive a tool for driving or screwing it into the hole. A bolt 5 extends through the bore 2 of the cylinder 1. This bolt has a circular or flanged head 6, provided with a square 7 to receive a wrench. The flange on the head is adapted to take over and bear on the flange $r$ of the rail. The bolt 5 screws into a nut 8, having formed in its upper face an annular groove or undercut channel 9, divided into sections by studs or ribs 10. The channel 9 receives hook-like tenons 11 on the respective extremities of parts 12, which are in the nature of segments of a tube, the latter having substantially the same diameter as the body of the cylinder 1. These segments have exteriorly serrations, shoulders, or teeth 13 and at their upper ends are beveled or flared interiorly, as seen at 14.

In applying the device the hole is first bored in the tie $t$, and the nut 8, with the segments 12, inserted. The cylinder or tubular screw-thread member 1 is then screwed down into the hole by any suitable tool until its upper end is ordinarily about level with the surface on which the rail rests, the cone 3 at its lower end entering the flared upper end of the tube formed by the segments 12. The bolt 5 is then inserted and screwed down into the nut 8, drawing the latter up and causing it to drive upward the segments 12, which are expanded or spread outward by the cone 3 and caused to engage or bite into the wood in the manner of barbs.

In lieu of having the nut 8 at the bottom of the hole and the head of the screw above the bolt may be reversed, with its head at the bottom of the hole. In this case the annular channel 9 would be formed in the head. This construction is illustrated in Fig. 6. In it 6ª designates the head of the bolt 5ª, and 9ª designates the annular groove in the face of the head about the body of the bolt. 8ª designates the nut.

The advantages I claim for my construction over the ordinary expanding bolt or spike is that it gives the bolt great stability and enables it to resist lateral shocks. In the application to securing rails to ties it enables any looseness to be taken up readily with a wrench. It permits the rail to be readily removed, as the bolt 5 may be drawn without disturbing the other parts. There is a material economy also over the use of spikes, which shiver and cut the ties.

It will be noted that the bolt 5 in any case carries an enlargement, whether it be a nut or the bolt-head, which takes under the tube-segments 12, this lateral enlargement being suitably channeled to form step-bearings in which the tenons on the segments find a bearing.

I am well aware that it is not new to provide an anchor or retainer for a bolt by mounting in the nut on the inner end of the bolt expanding segments to bite into the walls of the hole when a cone slidable on the bolt is driven in like a wedge between the segments.

Such devices are employed for anchoring bolts in walls, but are not suitable for use in securing railway-rails to wooden ties. In my construction the tube or cylinder 1, which is smooth inside and screw-threaded exteriorly, is screwed into the hole in the wood to serve as a guide for the bolt and as a bushing fixed in the wood. The segments 12 normally or before expansion fit snugly in the hole in the wood, and the bolt fits snugly in the guide or bushing 1. When the segments are expanded, all of the teeth 13 thereon bite into the wood, as clearly seen in Fig. 1. This construction especially adapts my construction for use in securing rails to wooden ties where there is constant jarring and lateral strains on the bolt or securing device.

Having thus described my invention, I claim—

1. In a device for the purpose specified, the combination with the tubular bushing and guide for the bolt, said guide being smooth on the inside, screw-threaded exteriorly, and coned at its inner end, and the bolt, the body of which fits the said guide and which has an enlarged and channeled step at its inner end to receive and form bearings for the expanding segments, of the said segments, forming a cylinder when closed, having teeth on their outer faces and flared or beveled at their upper ends to receive the conical end of the fixed bushing and guide.

2. In a device for the purpose specified, the combination with the tubular bushing and guide for the bolt, said guide being smooth on the inside, screw-threaded exteriorly, and coned at its inner end, and the bolt, the body of which fits said guide and which has an enlarged and channeled step at its inner end, the said channel being divided into sections by studs 10, and the segments 12, having tenons 11, which fit into the channel between the studs, and teeth 13 on their outer faces.

In witness whereof I have hereunto signed my name, this 8th day of July, 1901, in the presence of two subscribing witnesses.

GEORGES LAKHOVSKY.

Witnesses:
SOSTHÈNE POIGNANT,
EDWARD P. MACLEAN.